Oct. 10, 1967   J. M. BLAKEWAY ET AL   3,346,505
SULPHONATION OF ORGANIC COMPOUNDS
Filed March 15, 1963
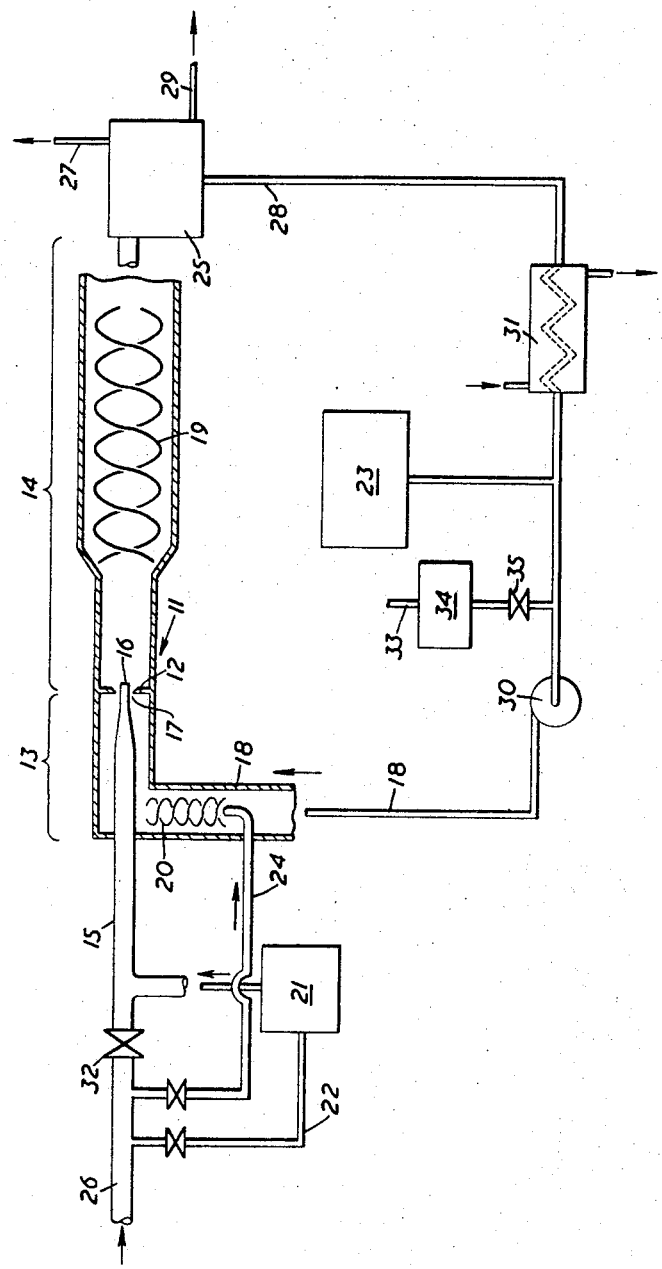
INVENTORS
JOHN M. BLAKEWAY
PHILIP MARSHALL
BY George H. Mortimer
ATTORNEY United States Patent Office 3,346,505
Patented Oct. 10, 1967

3,346,505
SULPHONATION OF ORGANIC COMPOUNDS
John Murray Blakeway, Bowdon, and Philip Marshall, Timperley, England, assignors to Colgate-Palmolive Company, New York, N.Y., a corporation of Delaware
Filed Mar. 15, 1963, Ser. No. 265,512
5 Claims. (Cl. 252—161)

This invention relates to the co-sulphonation of sulphonatable organic compounds of different volatilities with sulphur trioxide diluted with an inert gas.

Sulphonation with sulphur trioxide has advantages over more conventional sulphonation procedures using oleum, for example, notably that it is unnecessary to use an excess of sulphonating agent so the product after neutralisation contains little, if any, inorganic sulphate. Also, for a given throughput the cost of the plant and the sulphonating agent may be lower. On the other hand, the reaction between sulphur trioxide and sulphonatable organic compounds is violent and difficult to control, so to moderate this reaction and facilitate control it is known to dilute the sulphur trioxide with an inert gas (i.e. a gas inert to the reactants and the product) such as air.

Diluted sulphur trioxide can be used for the cosulphonation of mixtures of organic compounds, but problems arise if the compounds are of substantially different volatilities, for example, xylene or other lower alkyl benzene and higher alkyl benzene, or a lower alkyl benzene and an alkyl glycol ether which when sulphonated and neutralised are useful as active ingredients in detergent compositions.

The sulphonation of the more volatile component should be completed in one pass through the reaction zone, since otherwise at least some of the unsulphonated volatile component would escape from the reaction zone in the inert gas. However, if one attempts to co-sulphonate a mixture of the components introduced as such into the reaction zone, there is a substantial risk of incomplete sulphonation of the more volatile component owing to the competition for the available sulphur trioxide from the less volatile component, since there must not be an excess of sulphur trioxide present if charring and discoloration of the product is to be avoided. Indeed, to ensure that discoloration will not occur there must be slightly less sulphur trioxide than is theoretically necessary to sulphonate all the organic material.

According to the present invention a process for the co-sulphonation of organic compounds of different volatilities by means of sulphur trioxide diluted with an inert gas comprises introducing the less volatile component or components into a reaction zone together with diluted sulphur trioxide, and introducing the more volatile component or components into the reaction zone with additional diluted sulphur trioxide only when the sulphonation of the less volatile component or components has been partially completed.

The point at which the addition of the more volatile component or components is begun is not critical, but the earlier this is begun the greater is the risk of losing some of the more volatile component or components with the inert gas, while the later it is left the greater is the risk of colour degradation of the less volatile component or components.

The introduction of the more volatile component or components can begin, for example, when 50% of the less volatile component or components has been sulphonated. For instance, the introduction of the more volatile component or components may be begun when at least half the time necessary for complete sulphonation of the less volatile component or components has elapsed.

The extent to which sulphonation has occurred can be ascertained by calculation from the amounts of the less volatile component or components and of the sulphur trioxide which have been introduced into the reaction zone. As mentioned above, the total amount of sulphur trioxide employed should be slightly less than that required to effect complete sulphonation of the organic compounds.

The invention can be applied to any suitable sulphonation process or apparatus in which the sulphonating agent is diluted sulphur trioxide.

One suitable form of apparatus for carrying out the invention is illustrated in the accompanying diagrammatic drawing of which the upper part is in section and on larger scale than the lower part.

The apparatus illustrated in the drawing comprises a reactor consisting of a first passage 11 having an orifice plate 12 dividing it into a zone 13 of relatively high pressure and a zone 14 of relatively low pressure. A second passage 15 is connected to a source of sulphur trioxide and inert gas and terminates in a nozzle 16 protruding slightly beyond the orifice 17 in the plate 12. Owing to the presence of the nozzle 16 the orifice 17 is annular, and it is sharp edged to promote turbulence. A conduit 18 feeds organic compounds to the zone 13 of relatively high pressure. A flow breaker 19 is disposed in the zone 14 of relatively low pressure, at a distance from the orifice plate 12, while a further flow breaker 20 is disposed in the conduit 18 just upstream of its junction with the first passage 11. The flow breakers may be in a variety of forms and may consist of a variety of materials. Interlinked open helical coils of wire of a metal that is not attacked by sulphur trioxide are suitable. The purpose of the flow breaker 19 is to extend the zone of turbulence of the liquid organic compound which emerges as a free annular jet from the orifice 17. The purpose of the flow breaker 20 will be explained below.

A holding tank 21 contains vaporised sulphur trioxide from any suitable source. A stream of inert gas, that is dry air, tapped off from an air supply line 26 through a line 22 and is delivered to the tank 21 where it entrains sulphur trioxide vapour, the mixture passing into the second passage 15 where it mixes with a further quantity of air which enters via a valve 32 from the supply line 26. The gaseous mixture of sulphur trioxide and inert gas then passes into the low pressure zone 14 of the reactor from the passage 15 through the nozzle 16.

A holding tank 23 contains a less volatile component of the sulphonatable organic compounds which is pumped in liquid phase by a pump 30 to the high pressure zone 13 of the reactor by way of the conduit 18. From the high pressure zone 13, the organic compound passes through the annular orifice 17 as a free annular jet into the low pressure zone 14 with a considerable drop in pressure, thereby creating a zone of turbulence in the organic compound on the low pressure side of the reactor which results in uniform mixing of the sulphur trioxide/air mixture with the organic compound. The sharp edge of the orifice 17 enhances the turbulence and the flow breaker 19 extends the zone of turbulence, as already mentioned. The cross-section of the turbulent zone is increased towards the outlet end thereof to help diminish the rate of linear flow of the reactants, to provide time for the reaction to be substantially completed in the turbulent zone.

Additional air, or other inert gas, can be introduced into the organic compound in the conduit 18 by way of a conduit 24. Such introduction of inert gas is optional. However, when employed it can be used in amounts of up to 100% by volume (calculated at the pressure and temperature of the liquid), based on the volume of liquid being supplied to the reactor through the conduit 18. When such inert gas introduction is employed, the flow breaker 20 serves to break up the gas into small bubbles. As these bubbles pass through the orifice 17 they expand and increase the turbulence. The reaction products pass from the low pressure zone 14 of the reactor directly into a collection vessel 25. A venting line 27 for exhaust gases is provided on the collection vessel. A recycling or return line 28 connects the collection vessel to the conduit 18 so that at least a portion of the reaction products can be returned by the pump 30 to the high pressure zone 13 of the reactor after passing through a cooling heat exchanger 31. A take-off conduit 29 permits removal of the products from the system at will. When operating with a high degree of recycling the reaction temperature can in some cases be controlled wholly by means of the cooling effected in the heat exchanger 31. In other cases, where further cooling is required, this can be effected in any convenient way, for example by enclosing the reactor in a cooling jacket.

The more volatile component can be fed into the conduit 18 on the inlet side of the pump 30 from any suitable source by a pipe 33, a constant flow metering device 34 and a stop valve 35. The apparatus is so controlled that the valve 35 is not opened until the less volatile component has already been sulphonated to the extent of at least 50%.

For efficient operation pressures in a range of 10 p.s.i. abs. (pounds per square inch absolute) to 300 p.s.i.g. (pounds per square inch gauge) are preferred in the zone 13 of relatively high pressure, pressures in a range of 5 p.s.i. abs. to 10 p.s.i.g. in the zone 14 of relatively low pressure. The pressure drop across the orifice 17 is in a range of 5 to 300 p.s.i. The pressure drop should of course be sufficient to provide the required degree of turbulence under the prevailing operating conditions. The gaseous mixture of sulphur trioxide and inert gas is delivered to the low pressure zone 13 at a velocity in the nozzle 16 in a range of 50 ft./sec. to sonic velocity. The organic liquid is fed through the annular orifice 17 to the low pressure zone 14 at a velocity in a range of 5 ft./sec. to 500 ft./sec. Although such pressures and velocities are not critical, pressures and velocities can be selected within the ranges set forth to create a zone of turbulence sufficiently strong to result in uniform mixing of the sulphur trioxide and sulphonatable organic compounds. The velocities should also be so selected that the reaction mixture has not passed the flow breaker 19 before absorption of the sulphur trioxide is substantially complete.

The following example illustrate the invention.

*Example I*

90.4% by volume of dry air and 9.6% by volume of sulphur trioxide were mixed intimately with 350 lbs. tetrapropylene benzene in a reaction zone until the amount of the sulphur trioxide added corresponded to 50% completion of the sulphonation. 80 lbs. of xylene was then introduced continuously into the reaction zone while addition of the diluted sulphur trioxide continued, the rate of introduction of the xylene being such that it had all been added about 5 minutes before the completion of the addition of the diluted sulphur trioxide. The total reaction time was 137 minutes and the temperature of the reaction zone was maintained at 43–47° C.

The product had the following analysis, by weight.

| | Percent |
|---|---|
| Tetrapropylene benezene sulphonic acid | 80.9 |
| Xylene sulphonic acid | 16.1 |
| Sulphuric acid | 1.8 |
| Tetrapropylene benzene | 1.2 |

After neutralisation with caustic soda the product had a colour of 260 Klett.

*Example II*

4 parts of sulphur trioxide and 96 parts of dry air by volume were passed into 1512 g. of nonyl phenol ethylene oxide condensate for 91 minutes. After 51 minutes of the sulphur trioxide/air addition the metering of 97 g. of xylene into the reaction mixture was begun, and was continued at such a rate as to be completed 5 minutes before the final shut off of the sulphur trioxide/air mixture. The temperature of the reaction was kept below 50° C. The acids so produced were neutralised with sodium hydroxide to give a pale straw coloured paste and the product was analysed.

Analysis of neutralised product:

| | percent |
|---|---|
| Nonyl phenol ethylene oxide condensate sulphate | 20.3 |
| Xylene sulphonate | 1.9 |
| Moisture | 76.2 |
| Nonyl phenolethylene oxide condensate | 0.3 |
| Sodium sulphate | 1.3 |

Xylene conversion to sodium xylene sulphonate=91.7%

*Example III*

3.9 parts of sulphur trioxide and 96.1 parts of dry air by volume were passed into 1040 g. of lauryl alcohol ethylene oxide condensate for 63 minutes. After 33 minutes metering of 85 g. of xylene into the reaction mixture was begun, and was continued at such a rate as to be completed 5 minutes before the shut off of the sulphur trioxide/air mixture. The temperature of the reaction was kept below 48.5° C. The acids produced were neutralised with sodium hydroxide to give a cream coloured paste and the product was analysed.

Analysis of the neutralised product:

| | percent |
|---|---|
| Lauryl ether sulphate | 21.0 |
| Xylene sulphonate | 2.4 |
| Moisture | 74.2 |
| Lauryl alcohol ethylene oxide condensate | 1.9 |
| Sodium sulphate | 0.5 |

Xylene conversion to sodium xylene sulphonate=93.5%

What we claim as our invention and desire to secure by Letters Patent is:

1. A process for the co-sulphonation of a first sulphonatable organic compound, said compound being a higher alkyl benzene which when sulphonated and neutralized is useful as a detergent, and a lower alkyl benzene which comprises reacting a molar excess of said first organic compound in liquid phase with a gaseous mixture of sulphur trioxide and air in a reaction zone under sulphonating conditions until at least 50% of said first organic compound is sulphonated; introducing said lower alkyl benzene and additional gaseous sulphur trioxide diluted with air into the partially sulphonated reaction mixture under sulphonating conditions, the weight ratio of xylene to said first organic compound being selected from the range of about 1:4 to about 1:16 and said additional sulphur trioxide being sufficient substantially to complete the sulphonation of said first organic compound and said lower alkyl benzene; and maintaining the mixture of sulphur trioxide, first organic compound and said lower alkyl benzene in the reaction zone under sulphonating conditions until absorption of the sulphur trioxide is substantially complete.

2. A process in accordance with claim 1 wherein said lower alkyl benzene is xylene.

3. A process in accordance with claim 1 wherein said first sulphonatable organic compound and the gaseous mixture of sulphur trioxide and air are progressively introduced into the reaction zone and the lower alkyl benzene and the additional gaseous sulphur trioxide diluted with air are progressively introduced into the partially sulphonated mixture of said first organic compound.

4. A process in accordance with claim 1 wherein the total amount of sulphur trioxide added is slightly less than is theoretically necessary to sulphonate said first organic compound and said lower alkyl benzene.

5. A process for the co-sulphonation of a first sulphonatable organic compound, said compound being a higher alkyl benzene which when sulphonated and neutralized is useful as a detergent, and xylene which comprises passing said first sulphonatable compound in liquid phase in a zone of relatively high pressure in a range of 10 p.s.i. absolute to 300 p.s.i.g.; restricting the flow of said liquid phase sufficient to form a free annular jet of said first sulphonatable liquid at a velocity in a range of 5 feet per second to 500 feet per second in a zone of relatively low pressure in a range of about 5 p.s.i. absolute to about 10 p.s.i.g. and sufficient to create a zone of turbulence in said liquid; injecting a gaseous mixture of sulphur trioxide and inert gas into the center of said free annular jet in said low pressure zone at a velocity in the range of 50 feet per second to sonic velocity and sufficient to result in uniform mixing of said sulfur trioxide and said first sulphonatable organic compound in the zone of turbulence; maintaining said uniform mixture of sulphur trioxide and said first sulphonatable material in said low pressure zone at a temperature within the range of about 40 to 50° C. until at least 50% of said first organic compound is sulphonated; introducing xylene into the partially sulphonated reaction mixture in said high pressure zone, the weight ratio of xylene to said first organic compound being selected from the range of about 1:4 to about 1:16; passing said partially sulphonated reaction mixture containing xylene from said high pressure zone to said low pressure zone as a free annular jet at a velocity in a range of 5 feet per second to 500 feet per second in a zone of relatively low pressure in a range of about 5 p.s.i. absolute to about 10 p.s.i.g. and sufficient to form a zone of turbulence in said liquid; introducing additional sulphur trioxide diluted with air into the center of the jet of the mixture of the partially sulphonated first organic compound and xylene in said low pressure zone at a velocity in the range of 50 feet per second to sonic velocity and sufficient to result in uniform mixing of said sulphur trioxide, said sulphonatable organic compound and said xylene in the zone of turbulence; and maintaining said uniform mixture of sulphur trioxide, said sulphonatable organic compound and said xylene in said low pressure zone until absorption of the sulphur trioxide is substantially complete.

References Cited

UNITED STATES PATENTS

| | | | |
|---|---|---|---|
| 2,820,015 | 1/1958 | Smith | 252—161 |
| 2,940,936 | 6/1960 | Fike | 252—161 |

LEON D. ROSDOL, *Primary Examiner.*

JULIUS GREENWALD, *Examiner.*

J. T. FEDIGAN, *Assistant Examiner.*